(12) United States Patent
Wu

(10) Patent No.: US 9,511,730 B1
(45) Date of Patent: Dec. 6, 2016

(54) COLLISION WARNING SYSTEM

(71) Applicant: Thunder Power Hong Kong Ltd., Central (HK)

(72) Inventor: Tai-Te Wu, Taoyuan (TW)

(73) Assignee: THUNDER POWER HONG KONG LTD., Central (HK)

( * ) Notice: Subject to any disclaimer, the term of this patent is extended or adjusted under 35 U.S.C. 154(b) by 0 days.

(21) Appl. No.: 14/983,617

(22) Filed: Dec. 30, 2015

(51) Int. Cl.
*B60Q 1/00* (2006.01)
*B60R 21/013* (2006.01)
*B60R 21/00* (2006.01)

(52) U.S. Cl.
CPC ...... *B60R 21/013* (2013.01); *B60R 2021/0027* (2013.01); *B60R 2021/01317* (2013.01)

(58) Field of Classification Search
CPC .......... G08G 1/16; G08G 1/161; G08G 1/166; G08G 1/0962; G08G 1/096783; G08G 1/096791; B60Q 1/525; B60Q 5/006; B60Q 9/008; B60R 21/013; B60R 2021/0027; B60R 2021/01317
USPC ........ 340/435, 436, 433, 933, 936, 471, 472
See application file for complete search history.

(56) References Cited

U.S. PATENT DOCUMENTS

| | | | | |
|---|---|---|---|---|
| 4,482,885 A * | 11/1984 | Mochida | ................ | B60K 28/00 340/457 |
| 4,965,546 A * | 10/1990 | Chang | ...................... | B60Q 9/00 340/471 |
| 5,015,991 A * | 5/1991 | Barr | ........................ | B60Q 9/001 340/457 |
| 5,467,071 A * | 11/1995 | Koenig | ..................... | B60Q 1/50 340/433 |
| 5,914,651 A * | 6/1999 | Smalls | .................... | B60Q 1/486 340/435 |
| 5,969,603 A * | 10/1999 | Wang | ........................ | B60Q 1/52 340/471 |
| 6,097,311 A * | 8/2000 | Iwasaki | .................. | B60Q 9/008 340/435 |
| 6,535,137 B1 * | 3/2003 | Ryan | ................. | B60R 21/01556 340/457 |
| 6,922,147 B1 * | 7/2005 | Viksnins | ................ | B60N 2/002 340/457 |
| 7,012,533 B2 * | 3/2006 | Younse | ................... | B60N 2/002 340/457 |
| 2003/0122662 A1 * | 7/2003 | Quinonez | .............. | B60N 2/002 340/457 |
| 2011/0307146 A1 * | 12/2011 | Yang | ....................... | E05B 77/02 701/36 |
| 2012/0065858 A1 * | 3/2012 | Nickolaou | ............. | G08G 1/162 340/457 |
| 2012/0194356 A1 * | 8/2012 | Haines | ................... | G08G 1/161 340/933 |

(Continued)

*Primary Examiner* — Thomas Mullen
(74) *Attorney, Agent, or Firm* — Kilpatrick Townsend & Stockton LLP

(57) ABSTRACT

A collision warning system including a vehicle with a first sensor configured to detect an exit condition, a second sensor configured to detect a collision condition, an external warning signal system configured to emit a warning signal to warn a vehicle occupant about the collision condition, the external warning signal system includes at least one warning device configured to emit the warning signal, and a controller configured to communicate with the first and second sensors and to control the at least one warning device in response to the collision condition.

15 Claims, 4 Drawing Sheets

(56) References Cited

U.S. PATENT DOCUMENTS

2014/0015973 A1\* 1/2014 Vasquez ................ B60Q 9/008
348/148

\* cited by examiner

COLLISION WARNING SYSTEM

FIELD OF THE INVENTION

The disclosure generally relates to a collision warning system for a vehicle.

BACKGROUND OF THE INVENTION

Vehicles such as cars and trucks are used in a variety of environments. Some of these environments may include dense population centers, low visibility situations, difficult weather conditions, etc. At times, these environments may be challenging for those trying to exit a vehicle while still avoiding other vehicles and pedestrians. For example, in densely populated areas roads may offer limited space for vehicles and pedestrians to travel. Accordingly, accidents may occur when drivers and passengers attempt to exit vehicles during traffic. Traffic accidents may also occur as drivers and passengers exit vehicles in low visibility situations and bad weather.

SUMMARY OF THE INVENTION

The embodiments discussed below include a collision warning system capable of warning vehicle occupants and nearby traffic of a possible collision situation between a vehicle occupant exiting a vehicle and nearby traffic passing by. The collision warning system enables detection of a hazard condition in a variety of environments using one or more collision sensors. These environments may include dense population centers, low visibility situations, and difficult weather conditions. In some embodiments, the collision sensors may be complimentary; thus, enabling detection of a hazard condition even when some sensor capabilities are degraded (e.g., low light, bad weather). In order to warn vehicle occupants and/or neighboring traffic of a possible hazard condition, the collision warning system may include an internal warning signal system and/or an external warning signal system. The internal and external warning signal systems include one or more warning devices capable of providing a warning signal to vehicle occupants and nearby traffic. The warning signals may be audio, visual, and/or vibratory.

DETAILED DESCRIPTION

Figure 1:
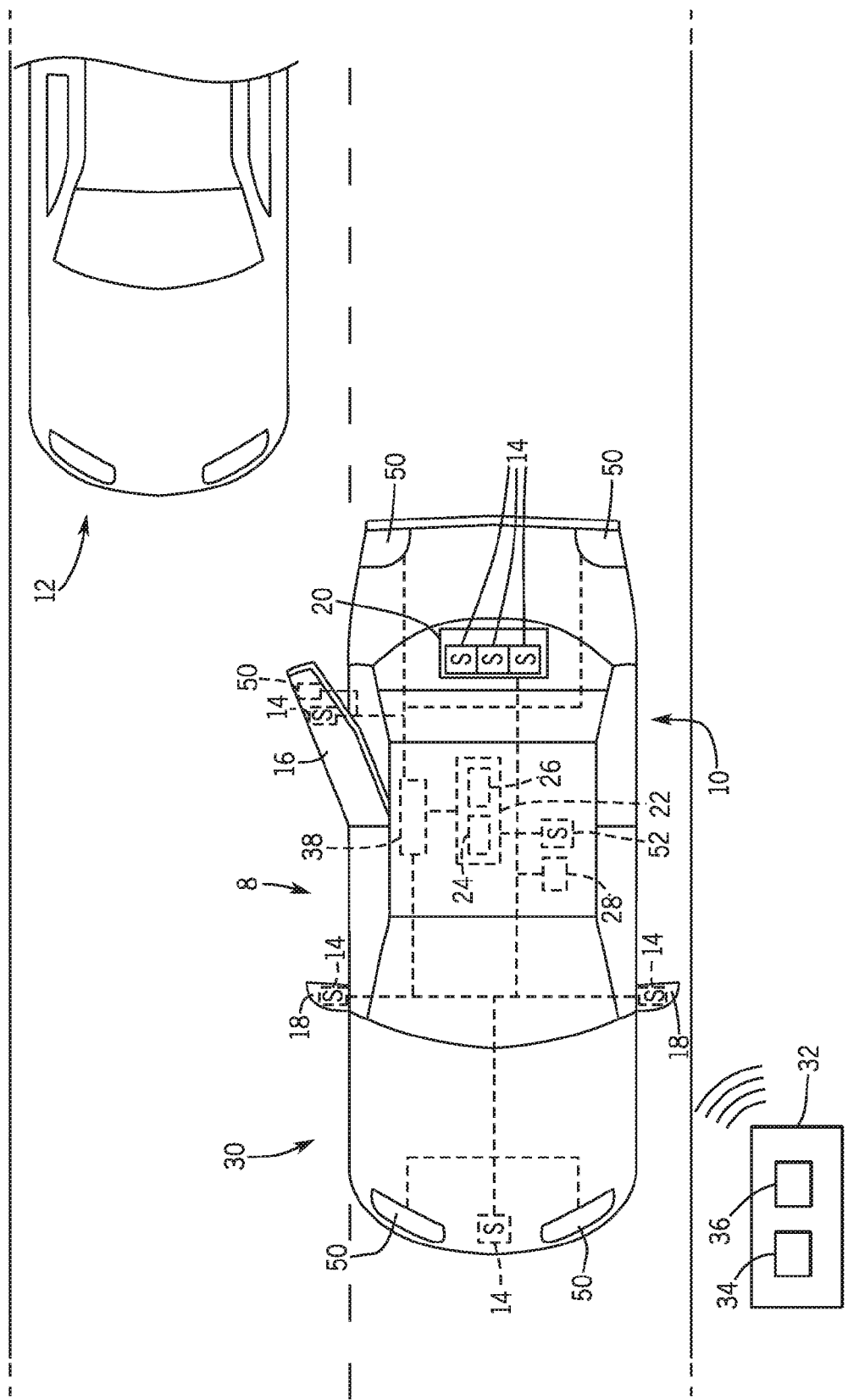
FIG. 1 is a top view of an embodiment of a vehicle with a collision warning system.

FIG. 1 is a top view of an embodiment of a vehicle 8 with a collision warning system 10. While FIG. 1 illustrates a car as the vehicle 8, the vehicle 8 may be any number of other vehicles (e.g., car, truck, train, airplane, motorcycle, etc.). In operation, the collision warning system 10 warns vehicle occupants of an approaching hazard 12 before and/or while the vehicle occupants exit the vehicle 8. Approaching hazards 12 may include other vehicles and/or pedestrians. In some embodiments, the collision warning system 10 may also warn neighboring traffic (e.g., other vehicles and/or pedestrians) that someone is attempting to exit or dismount the vehicle 8, thus further reducing the risk of a traffic accident.

The collision warning system 10 includes a variety of components that operate together in order to warn drivers and passengers of a potential hazard(s) 12 as well as neighboring pedestrians, and/or other vehicles that someone is about to or is in the process of exiting the vehicle 8. These components may include a variety of collision sensors 14 placed at different locations on the vehicle 8. For example, the collision sensors 14 may couple to the front of the vehicle 8, the back of the vehicle 8, on top of the vehicle 8, sides of the vehicle 8 (e.g., doors 16), and/or the side mirrors 18, etc. In this way, the collision warning system 10 may enable 360 degree collision warning for hazards 12 approaching the vehicle 8. However, in some embodiments the vehicle 8 may only have collision sensors 14 that detect hazards 12 from one direction (e.g., hazards 12 approaching from the rear of the vehicle 8).

The collision sensors 14 may be optical cameras, infrared cameras, motion detectors, radar, lasers, ultrasonic sensors, etc. In some embodiments, the collision warning system 10 may include sensor packages 20 that include one or more collision sensors 14 (e.g., optical cameras, infrared cameras, motion detectors, radar, lasers, ultrasonic sensors, etc.). By including a variety of collision sensors 14, the collision warning system 10 may provide redundant detection of hazards 12 in different environmental conditions. For example, during daylight hours the optical camera may provide hazard 12 detection, but at night or in low light conditions the optical camera may not be able to identify hazards 12. In these situations, another collision sensor 14, such as an infrared camera or radar, may then provide hazard 12 detection. In other words, when the capability of one collision sensor 14 is degraded another collision sensor 14 may still detect hazards 12. Accordingly, the collision warning system 10 may provide continuous or near continuous hazard 12 detection in a variety of conditions such as rain, low light, snow, fog, sand/dust storms, among others.

In operation, the collision sensors 14 transmit signals (e.g., wirelessly, through wired connections) to a controller 22 (e.g., computer). The controller 22 may include one or more processors 24 that execute instructions stored on one or more memories 26 to process the signals (e.g., data) from the collision sensors 14. For example, the controller 22 may receive a signal (e.g., data) from an optical camera. The processor 24 may then execute a program stored on the memory 26 that recognizes objects (e.g., cars, trucks, bicycles, pedestrians, animals, etc.) in images taken by the optical camera. If the controller 22 detects a hazard 12, the processor 24 executes instructions to activate an internal warning signal system 28 and/or an external warning signal system 30. In some embodiments, the controller 22 may continuously receive feedback from the collision sensor 14 enabling the controller 22 to track changes of the potential hazard 12 and determine if the changes alter the collision condition (e.g., increase the risk of collision, reduce the risk of collision, or remove the risk of collision). These changes may include changes in the speed of the hazard 12; changes in the distance between the hazard 12 and the vehicle 8; changes in the direction of travel of the hazard 12; etc. Furthermore, in some embodiments, the controller 22 may simultaneously receive feedback from multiple collision sensors 14 enabling the controller 22 to more accurately identify a hazard 12 and determine a collision condition or situation.

In some embodiments, the collision warning system 10 may connect to a remote server 32 that processes the signals from the collision sensors 14. Indeed, instead of including processor(s) 24 on the vehicle 8 that are capable of processing the feedback from the collision sensors 14, a remote server 32 with one or more processors 34 may process signals from the collision sensors 14 using instructions (e.g., programs) stored on one or more memories 36. For example, the collision warning system 10 may include a transmitter/receiver 38 that receives signals either directly from the collision sensors 14 or receives the signals through the controller 22. The transmitter/receiver 38 then transmits the sensor signals (e.g., through cellular networks, wireless networks, etc.) to the server 32, which then processes the signals and identifies whether a collision condition exists. If the server 32 identifies a collision condition then the server 32 transmits a signal to the controller 22 to activate the internal warning signal system 28 and/or the external warning signal system 30. In some embodiments, the controller 22 and the server 32 may redundantly process signals from the collision sensors 14, or the server 32 may only process feedback from the collision sensor 14 if the controller 22 is unable to do so.

Figure 2:
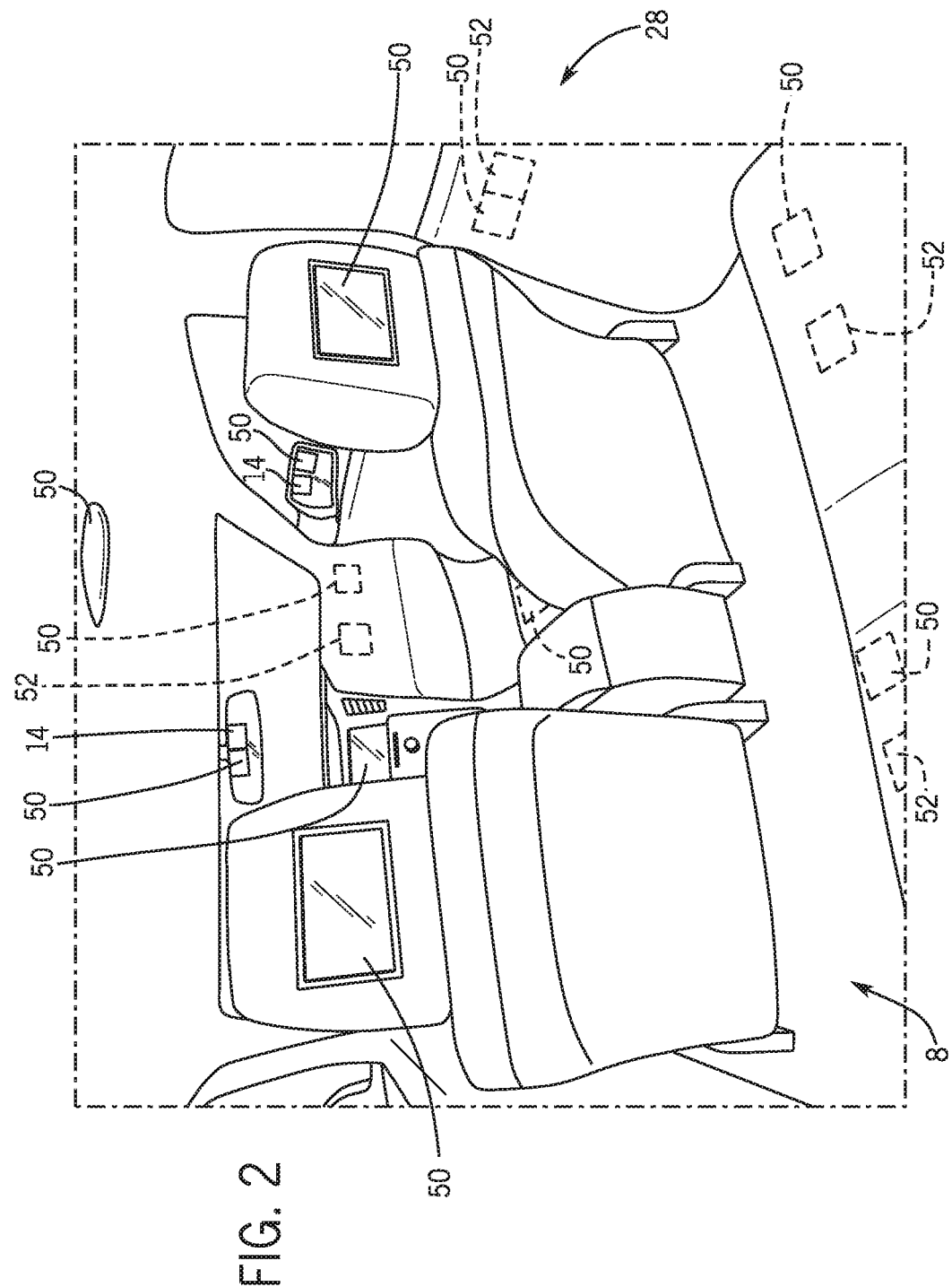
FIG. 2 is an inside view of an embodiment of a vehicle with a collision warning system.

FIG. 2 is an inside view of an embodiment of a vehicle 8 with a collision warning system 10. As explained above, once a collision condition is identified the controller 22 activates an internal warning signal system 28. The internal warning signal system 28 may include any number of warning devices 50 that communicate in one or more ways with the vehicle occupants (e.g., visual, audio, vibration). For example, one warning device 50 may be a display (e.g., center console display, dashboard display, seat display, heads-up display) within the vehicle 8 that provides a warning message. For example, the message may be a written message that flashes, scrolls, etc. on the display. In some embodiments, the message may be a picture that illustrates the vehicle 8 and the potential hazard 12 with a symbol (e.g., dot, vehicle symbol, pedestrian symbol). The display may also illustrate the location of the potential hazard 12 with respect to the vehicle 8. Moreover, in some embodiments, the controller 22 may be able to identify the type of hazard 12 and then display the specific type of hazard 12 (e.g., pedestrian, vehicle, animal) on the display, thus providing the vehicle occupants with more situational awareness.

In some embodiments, the internal warning signal system 28 may include one or more warning devices 50 that provide an audio warning signal. For example, one or more warning devices 50 may be audio speakers (e.g., speakers coupled to a display, vehicle speakers, etc.). These audio speakers may provide a brief audio message that warns the vehicle occupants of the potential hazards 12 outside of the vehicle 8. The audio message may be a generic warning or a specific warning that gives additional details about the type of hazard 12 (e.g., pedestrian, vehicle, animal, location, etc.).

The internal warning signal system 28 may also include warning device(s) 50 that are lights. For example, the warning device(s) 50 may be cabin lights, reading lights, lights in the rear view mirror, lights in the side mirrors, lights on doors, lights on the car frame, or any combination thereof. These lights may flash, remain completely on, change colors, etc. For example, if the hazard 12 is a vehicle, the controller 22 may rapidly flash the lights, while slowly flashing the lights if the hazard 12 is a pedestrian. In some embodiments, the controller 22 may increase light intensity, increase flashing, and/or change colors, etc. as the hazard 12 approaches, maintains speed, increases in speed, etc. For example, if the hazard 12 is outside of a threshold distance green lights may slowly flash to advise the vehicle occupant that a hazard 12 is approaching, but is still far enough away that the vehicle occupant may exit the vehicle while avoiding a collision. If the hazard 12 is closer, increases speed, etc. the lights may change from green to yellow flashing lights. If the hazard 12 is close and a collision is imminent or highly likely, the lights may change from yellow to red to indicate that the vehicle occupant should remain in the car until the hazard 12 has passed. Likewise, if the hazard condition changes (e.g., the hazard 12 reduces speed, changes direction, etc.) the lights may decrease in intensity, decrease rate of flashing, and/or change colors, etc. In some embodiments, the controller 22 may activate lights in specific locations in the vehicle 8 depending on the location of the hazard 12 and/or the location where the vehicle occupant will exit the vehicle 8. For example, if the hazard 12 is on a specific side of a vehicle 8, lights may be activated only on the side of the vehicle 8 where the hazard 12 may cause a collision.

In order to assist handicapped individuals, the internal warning signal system 28 may include one or more warning device(s) 50 capable of warning a handicapped individual. As explained above, the internal warning signal system 28 may include visual and/or audio warning devices 50. However, audio and visual warnings may be ineffective for people that are visually and/or hearing impaired. Therefore, by including vibratory warning devices 50, the internal warning signal system 28 is able to warn/caution handicapped individuals of potential hazards 12 when exiting a vehicle 8. The vibrator warning devices 50 may be placed at various locations in the vehicle 8. For example, vibrator warning devices 50 may be placed on the floor of the vehicle 8, enabling the occupant to feel the vibration through their feet. The vibrator warning devices 50 may also be placed in the seats, armrests, backrests, door handles, etc. In some embodiments, the controller 22 may change how the vibration warning device 50 operates in response to the collision condition. For example, if a hazard 12 is outside a threshold distance, the vibration warning device 50 may periodically turn on and off to indicate that there is a hazard 12, but that the hazard 12 is outside a threshold distance from the vehicle 8. If the hazard 12 is within a threshold distance, the vibration warning device 50 may activate and remain on, increase intensity, vibrate rapidly, etc. until the collision condition has passed.

While the above examples of warning devices 50 have been discussed individually some embodiments of the internal warning signal system 28 may combine all or some of the different types of warning devices 50 together. For example, the internal warning signal system 28 may combine warning devices 50 that provide a visual message (e.g., display and/or lights) with a warning device 50 that provides an audio message. In some embodiments, the internal warning signal system 28 may warn vehicle occupants through warning devices 50 that provide vibratory, visual, and auditory signals.

In operation, the internal warning signal system 28 may be triggered through feedback from exit sensors 52 and/or the location of the hazard 12. In order to determine where the vehicle occupant will exit the vehicle, the controller 22 may use one or more exit sensors 52 (e.g., a vehicle occupant sensor). The exit sensors 52 may include motion sensors, optical cameras, seat belt sensors, an ignition sensor, a vehicle motion sensor, weight sensors, a gear sensor, door handle sensors, etc. In some embodiments, the controller 22 may use feedback from the exit sensors 52 and collision sensors 14, in order to warn all vehicle occupants or tailor the warning signals (e.g., to a subset of the vehicle occupants). For example, the controller 22 may receive signals indicating the location of the vehicle occupant that is about to exit the vehicle 8 (e.g., front seat, back seat, driver's seat, etc.). In response, the controller 22 may not activate a warning device 50 if the hazard 12 is approaching a right side of the vehicle 8, and the vehicle occupant is exiting the left side of the vehicle 8. However, if there is a vehicle occupant exiting on the right side of the vehicle 8 and the hazard condition is on the right side then the controller 22 may activate warning devices 50 located on the right side of the vehicle 8 or throughout the vehicle 8.

Figure 3:
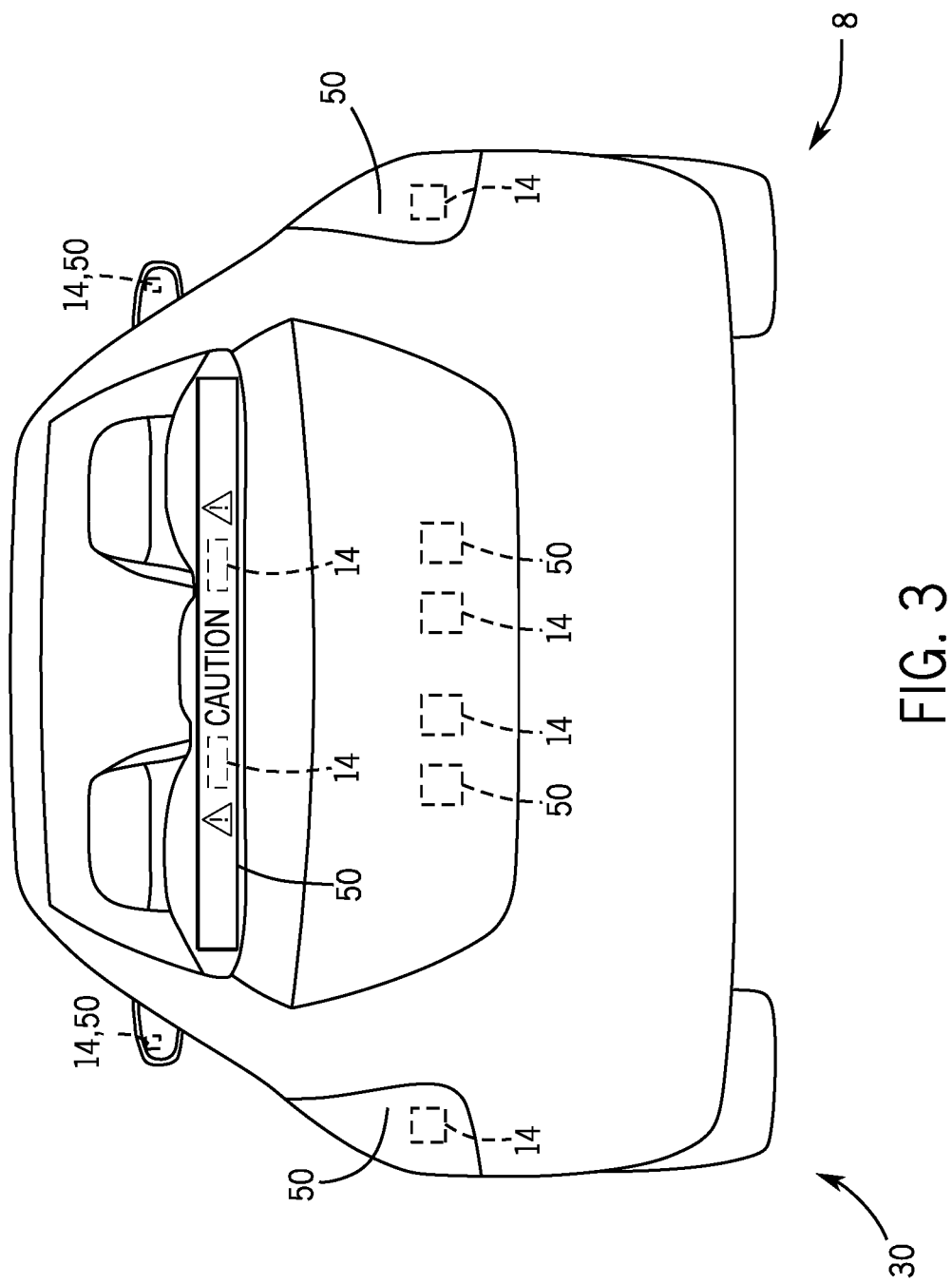
FIG. 3 is a rear view of an embodiment of a vehicle with a collision warning system.

FIG. 3 is a rear view of an embodiment of a vehicle 8 with a collision warning system 10. As mentioned above, the collision warning system 10 may also warn nearby traffic about a vehicle occupant that is about to or is in the process of exiting the vehicle 8 using the external warning signal system 30. In other words, the collision warning system 10 is capable of warning vehicle occupants of a hazard condition as well as those outside of the vehicle 8. The collision warning system 10 may do this through warning devices 50 that are either visual, auditory, or through a combination of both visual and auditory signals. As illustrated, an external warning signal system 30 includes warning devices 50. The warning devices 50 may be lights (e.g., taillights, turn signal lights, headlights, and/or special dedicated lights used by the collision warning system 10). These lights may automatically activate when a vehicle occupant triggers one or more exit sensors 52 (e.g., releases a seatbelt, grabs a door handle, stops the car, turns the ignition off, pushes a button, or a combination thereof). In some embodiments, the lights may only turn on when a hazard condition has been identified.

Once the lights are active, the controller 22 may change/adjust the lights in response to changing conditions around the vehicle, the lights may flash, change color, change intensity, etc. For example, the controller 22 may increase light intensity, increase flashing, and/or change colors as the hazard 12 approaches, maintains speed, increases in speed, etc. For example, if the hazard 12 is outside of a threshold range then lights (e.g., yellow lights) may slowly flash to advise the oncoming traffic about a collision condition. As the hazard 12 approaches, increases speed, comes within a threshold range of the vehicle 8, etc., the lights may change from yellow to red, increase intensity, increase in flash frequency, or a combination thereof. In some embodiments, the controller 22 may activate lights at specific locations on the vehicle 8 depending on the location of the hazard 12 and whether a vehicle occupant will exit the vehicle 8 into the path of or near the hazard 12. For example, if the hazard 12 is on a specific side of a vehicle 8, lights may be activated only on the side of the vehicle 8 where the hazard 12 may cause a collision. In some embodiments, warning devices 50 that are part of the internal warning signal system 28 may be part of or assist the external warning signal system 30. As explained above, the internal warning signal system 28 may include lights that couple to the door 16. These lights may remain active when the door 16 opens to provide additional warning to neighboring traffic. In some embodiments, the lights on the door 16 may turn on, change colors, change intensity, start flashing etc. when the controller 22 senses that the door is open and traffic is now able to see the lights.

The warning device 50 of the external warning signal system 30 may also include one or more displays (e.g., heads-up display, monitors, etc.) as the warning device(s) 50. The display may be within the vehicle 8 or coupled to the exterior of the vehicle 8. In operation, the display may provide a written message such as "caution" or "warning," which flashes, scrolls, etc. across the display. In some embodiments, the message may be a symbol such as an arrow, a stop sign, an image of a person exiting a vehicle, etc. In some embodiments, the display may combine a written message with a symbol/picture. For example, the display may alternatingly present the written message and symbol/picture; simultaneously present the written message and symbol/picture; etc. enabling neighboring traffic to more clearly understand the possible collision condition.

The external warning signal system 30 may also include audio speakers as the warning device 50. In operation, the audio speakers may provide a brief audio message that warns traffic near the vehicle 8 that someone is attempting to exit the vehicle 8. The audio message may be a warning noise (e.g., beeping, honking), a recorded message (e.g., a message that repeats "caution," "warning"), or a combination thereof. In some embodiments, the audio speakers used by the external warning signal system 30 may couple to the doors 16 and are activated when the doors 16 open.

Figure 4:
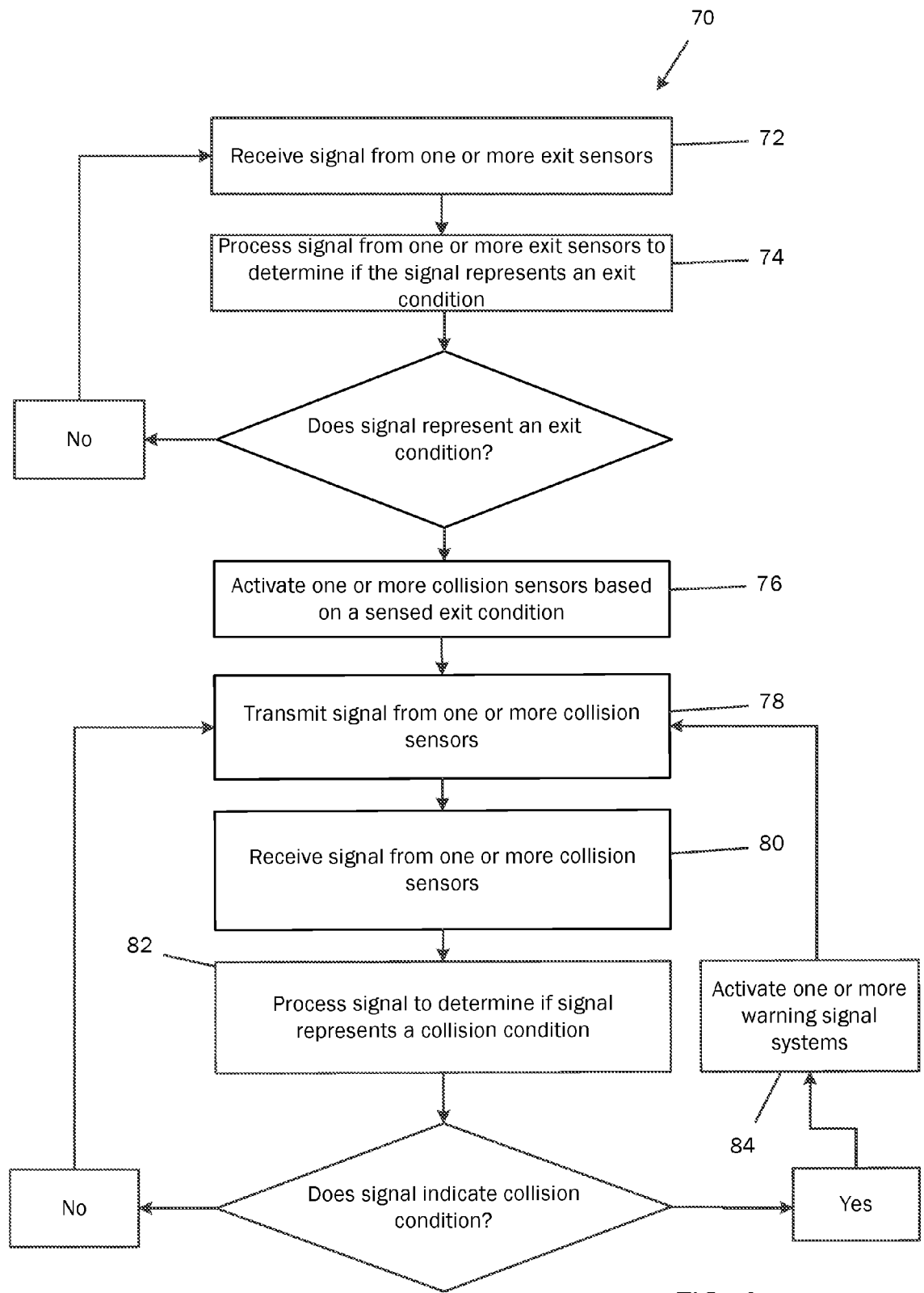
FIG. 4 is a flow chart of an embodiment of a method illustrating operation of the collision warning system.

FIG. 4 is a flow chart 70 of an embodiment of a method of operation of the collision warning system 10. In some embodiments, operation of the collision warning system 10 starts when the controller 22 receives one or more signals from one or more exit sensors 52 (step 72). The exit sensors 52 may include a motion sensor, optical camera, seat belt sensor, ignition sensor, vehicle motion sensor, door handle sensor, etc. The controller 22 may then process the signals from the exit sensors 52 to determine whether an exit condition exists (e.g., if an occupant is preparing or is likely to exit the vehicle 8) (step 74). For example, the controller 22 may receive signals from exit sensors 52 (e.g., vehicle motion sensor, seatbelt sensor) that indicate the vehicle 8 is no longer moving and that a seatbelt was unfastened. In some embodiments, the controller 22 may receive a signal from exit sensors 52 that indicate that the vehicle 8 is now in a park gear and/or the vehicle ignition has been turned off. The controller 22 may then process these signals using a program stored in the memory 26 to determine whether this is an exit condition. If an exit condition exists, the controller 22 activates one or more collision sensors 14 (step 76). If not, the controller 22 waits for additional signals from the exit sensors 52 (step 72).

Once the collision sensors 14 are active, the collision sensors 14 begin transmitting to the controller 22 and/or to the server 32 (step 78). The controller 22 and/or server 32 receive the signals (e.g., data) from the collision sensors 14 (step 80). After receiving the signals, the controller 22 and/or server 32 processes the signals using one or more programs stored in the memories 26, 34 to determine if a collision condition exists (e.g., whether nearby traffic is capable of contacting the vehicle occupants as they exit the vehicle 8) (step 82). If no collision condition exists then the collision sensors 14 may continue to transmit signals from the collision sensors to the controller 22 and/or server for monitoring. In some embodiments, the collision warning system 10 may continue to monitor the collision sensors 14 until all of the vehicle occupants have left the vehicle 8 (e.g., until the vehicle is locked, etc.). For example, the controller 22 may continue to monitor signals from the exit sensors 52 (e.g., weight sensors, motion sensors) until all of the vehicle occupants have left.

If the controller 22 and/or server 32 detect a hazard condition then the controller 22 activates the internal and/or external warning signal system 28, 30 (step 84). As explained above, the internal warning signal system 28 may use a variety of warning devices 50 to communicate with vehicle occupants through audio, visual, and/or vibratory signals. Likewise, the external warning signal system 30 communicates with traffic (e.g., other vehicles, pedestrians) through warning devices 50 about a possible hazard condition as someone exits the vehicle 8. As explained above, the warning devices 50 of the external warning signal system 30 may communicate using visual signals, auditory signals, or a combination of auditory and visual signals. Once activated, the internal and external warning signal systems 28, 30 may remain on until the vehicle is locked, until the controller 22 determines there are no more vehicle occupants, until there is no longer a hazard condition, and/or for a specific time period, etc.

Implementations of the embodiments may be made in hardware, firmware, software, or various combinations thereof. The embodiments may also be implemented as instructions stored on a machine-readable medium, which may be read and executed using one or more processing devices. In one implementation, machine-readable media may include various mechanisms for storing and/or transmitting information in a form that can be read by a machine (e.g., a computing device). For example, machine-readable storage media may include read-only memory, random access memory, magnetic disk storage media, optical storage media, flash memory devices, and other media for storing information, and machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A vehicle, comprising:
    a collision warning system, comprising:
        a first sensor coupled to the vehicle and configured to generate a first signal indicating an exit condition;
        a second sensor coupled to the vehicle and configured to generate a second signal indicating a collision condition;
        an external warning signal system coupled to the vehicle and configured to emit a humanly perceptible audio and/or visual external warning signal to warn about the collision condition, the external warning signal system comprising:
            a warning device coupled to the vehicle and configured to emit the humanly perceptible audio and/or visual external warning signal; and
            a controller coupled to the vehicle and configured to:
                receive the first signal from the first sensor;
                receive the second signal from the second sensor; and
                generate a control signal to control the warning device to emit the humanly perceptible audio and/or visual external warning signal to warn about the collision condition in response to receiving the first and second signals within a same time period.

2. The system of claim 1, wherein the first sensor is at least one of a seatbelt sensor, motion sensor, optical camera, ignition sensor, gear sensor, and door handle sensor.

3. The system of claim 1, wherein the second sensor is at least one of an optical camera, infrared camera, motion detector, radar, laser, and ultrasonic sensor.

4. The system of claim 1, wherein the humanly perceptible visual external warning signal is a light beam.

5. The system of claim 1, wherein the warning device is a display that displays at least one of a written message and a visual image that warns neighboring traffic of the collision condition.

6. The system of claim 1, wherein the warning device is an audio speaker.

7. A method for warning traffic of a collision condition around a vehicle, comprising:
    receiving a first signal from a first sensor coupled to the vehicle, the first signal indicating an exit condition;
    receiving a second signal from a second sensor coupled to the vehicle, the second signal indicating a collision condition;
    detecting a collision condition in response to the first and second signals; and
    generating a control signal to cause a warning device coupled to the vehicle to emit a humanly perceptible audio and/or visual external warning signal in response to the detected collision condition.

8. The method of claim 7, wherein the first sensor is at least one of a seatbelt sensor, motion sensor, optical camera, ignition sensor, gear sensor, and door handle sensor.

9. The method of claim 7, wherein the second sensor is at least one of an optical camera, infrared camera, motion detector, radar, laser, and ultrasonic sensor.

10. The method of claim 7, wherein the humanly perceptible visual external warning signal is a light beam.

11. The method of claim 10, further comprising changing at least one of a color, an intensity, and a flash frequency of the light beam in response to a change in the collision condition.

12. The method of claim 7, wherein the warning device is a display.

13. The method of claim 12, further comprising displaying with the display at least one of a written message and a visual image as the humanly perceptible visual external warning signal.

14. The method of claim 7, wherein the warning device is an audio speaker.

15. The method of claim 7, further comprising activating the visual warning signal on a side of the vehicle where a passenger will exit.

* * * * *